Feb. 1, 1927. 1,616,257
J. E. GLEASON
METHOD OF AND MACHINE FOR CUTTING GEARS
Filed June 6, 1925   5 Sheets-Sheet 1
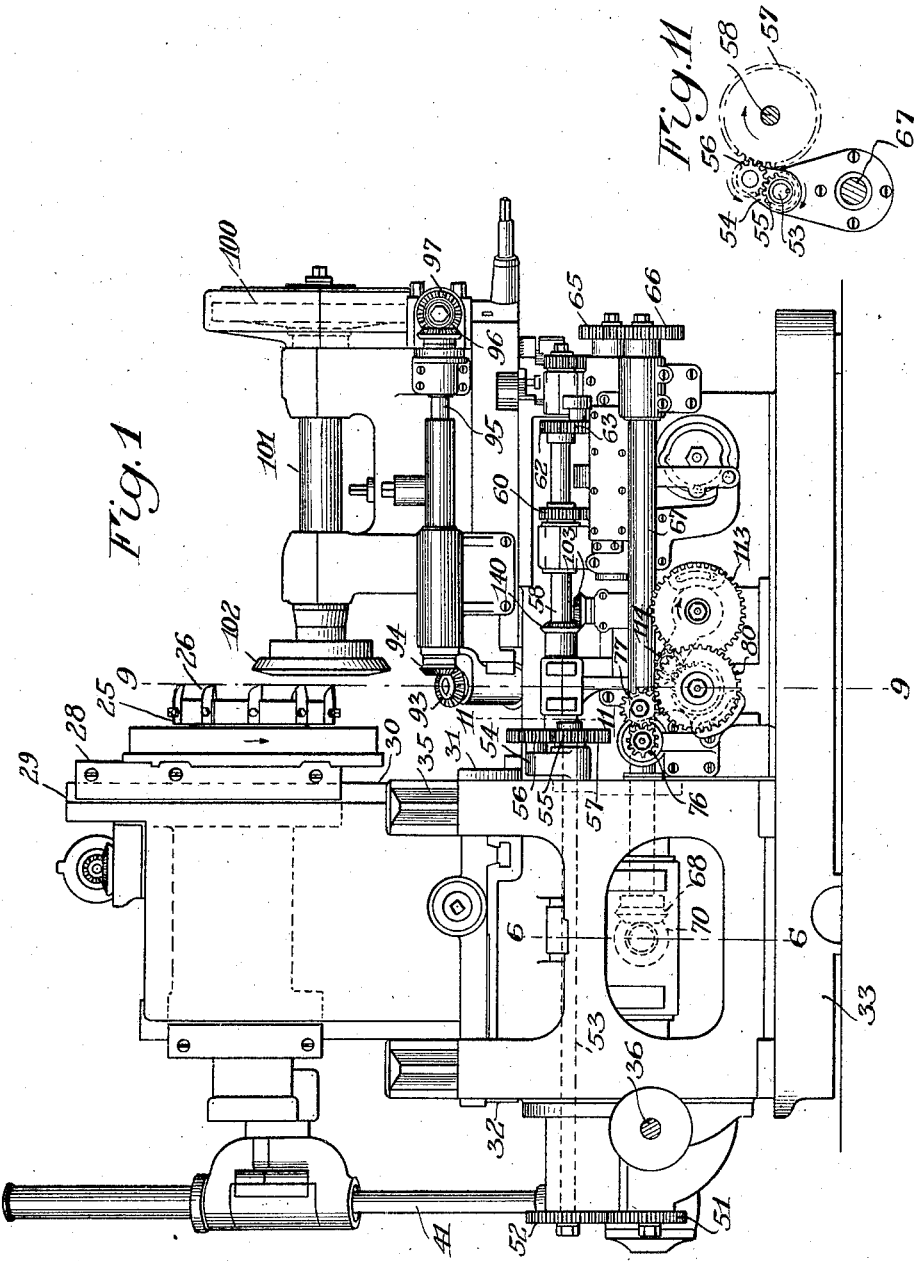
INVENTOR.
James E. Gleason
BY
his ATTORNEY.

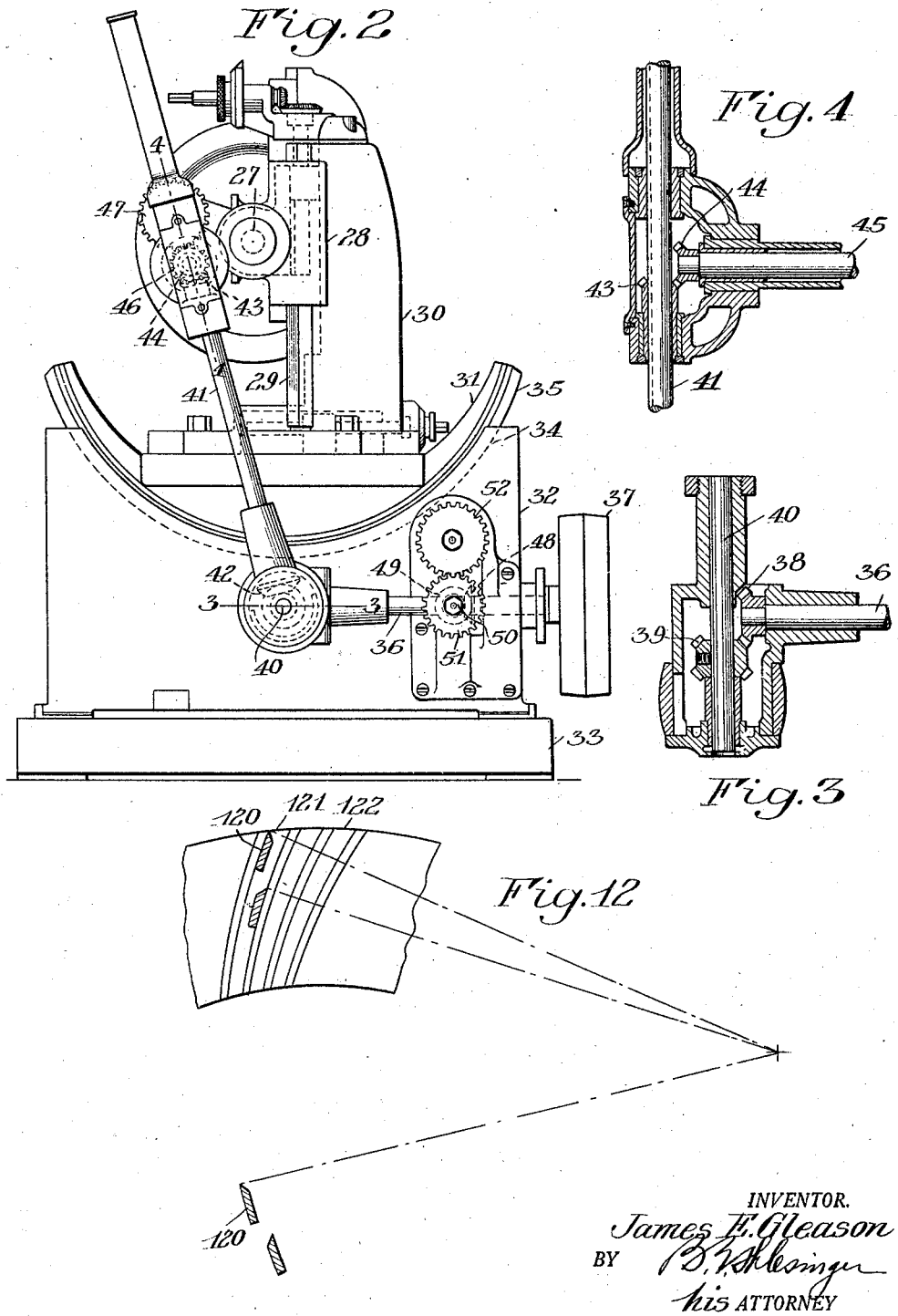

Feb. 1, 1927.
J. E. GLEASON
1,616,257
METHOD OF AND MACHINE FOR CUTTING GEARS
Filed June 6, 1925    5 Sheets-Sheet 3

INVENTOR.
James E. Gleason
BY
his ATTORNEY

Feb. 1, 1927.

J. E. GLEASON 1,616,257

METHOD OF AND MACHINE FOR CUTTING GEARS

Filed June 6, 1925    5 Sheets-Sheet 4

INVENTOR.
James E. Gleason
BY
his ATTORNEY

Patented Feb. 1, 1927.

1,616,257

UNITED STATES PATENT OFFICE.

JAMES E. GLEASON, OF ROCHESTER, NEW YORK, ASSIGNOR TO GLEASON WORKS, OF ROCHESTER, NEW YORK, A CORPORATION OF NEW YORK.

METHOD OF AND MACHINE FOR CUTTING GEARS.

Application filed June 6, 1925. Serial No. 35,363.

This invention relates particularly to a machine and method for cutting curved tooth gears and especially for cutting curved tooth gears from conical blanks.

One object of the invention is to provide a machine and method for producing curved tooth bevel gears, in which all the teeth will be completed simultaneously, and in which the tool employed may be readily adjusted and readily maintained in its position of adjustment.

A further object of the invention is to provide a machine and method for producing curved tooth gears which will permit indexing of the blank periodically without relative withdrawal of tool and blank after operation upon each tooth space.

Other objects will be apparent hereinafter from the specification and the claims.

One embodiment of the invention is illustrated in the accompanying drawings, in which:

Fig. 1 is a side elevation of a machine constructed according to the invention, the blank and tool head being shown, for the sake of clearness, out of cutting relation;

Fig. 2 is an end elevation looking to the right of Fig. 1;

Fig. 3 is a sectional view on the line 3—3 of Fig. 2;

Fig. 4 is a sectional view on the line 4—4 of Fig. 2;

Fig. 11 is a sectional view on the line 11—11 of Fig. 1; and

Fig. 12 is a diagrammatic view showing one type of tool, usable with my invention and the manner the same engages the blank.

Figure 5:
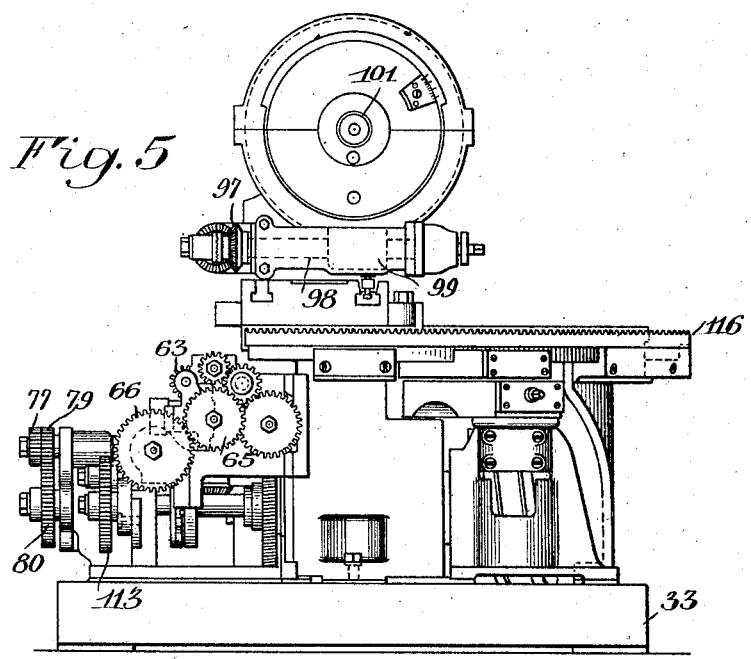
Fig. 5 is an end elevation looking to the left of Fig. 1.

In generating curved tooth bevel gears, it is most usual to employ a rotary tool and the type of rotary tool most generally used is one having a plurality of cutting edges or blades projecting from a plane face. According to the system most widely used, the tool and blank are rolled together to completely generate each tooth space and the blank is indexed to bring successive tooth spaces into position for operation upon by the tool. Each tooth is completely generated before any operations are performed on any of the other teeth. With this method the blank is liable to become distorted because it is being cut only at one point and may become considerably heated at this point. With this method also, the tool and blank must be withdrawn relatively to each other to permit indexing and this relative withdrawal means a loss in cutting time. Another method has been proposed for cutting with a tool of the general type mentioned. In this method the blades are so arranged on the cutting tool that successive blades or successive groups of blades come into engagement with successive teeth on the blank and all the teeth are completed simultaneously. This latter method has the advantage over the first described method in being faster. With this latter method, the tool wear will be distributed evenly over all the teeth and the possibility of distortion is reduced to a minimum as all the teeth are being operated upon simultaneously or practically simultaneously. While the second method has certain advantages over the first method, as pointed out, it has one serious disadvantage, which has heretofore militated against its general use. This is the serious difficulty encountered in adjusting the blades on the tool head. With the first method, the blades on the cutter head move in a path which is the same as the curve produced on the blank, but with the second method the blades must be adjusted so as to produce on the blank a curve which is a resultant of the combined motions of the tool and blank in their rotation about their respective axes in timed relation. The blades of the tool employed in the second method do not move in a path the same as the curve produced on the blank. To secure the proper tooth curvature with the second method, means therefore, a most accurate adjustment of the blades and this is not always easy to obtain or maintain.

The present invention aims to combine the good features of both of the above described methods without any of their disadvantages. This object is accomplished by so moving the tool and the gear blank that the blank is indexed between the engagement therewith of successive blades or of successive groups of blades of the tool. With this invention, the tools can be so arranged as to move in a path which is the same as the curve produced on the blank; the tool will take one cut on each tooth space all the way around the blank and the teeth will be completed simultaneously. With this method it is not necessary to withdraw the tool and blank relatively to each other to index the blank. The present invention, therefore, permits the employment of a tool whose blades can be readily adjusted into and maintained in position, and, at the same time, it avoids distortion of the blank and any differences in tooth form which might arise due to wear of the cutting blades.

While I have illustrated in the drawings one embodiment of my invention, it is to be understood that the invention is capable of further modification within its scope and the limits of the accompanying claims.

Referring to the drawings by numerals of reference, I have shown at 25 the preferred type of tool, which comprises a cutter head provided with a plurality of cutting blades 26 spaced apart equal distances around the cutter head to permit of indexing the blank in the interval between the engagement therewith of successive blades.

This cutter head 25 is mounted upon a spindle 27 rotatable in a vertically adjustable housing 28, adjustable on ways 29 on the standard 30 (Fig. 2) which is arranged for horizontal adjustment on the cradle 31 which is oscillatably mounted on the bed 32 of the frame 33, the bed being provided with ways 34 which are engaged by the tracks 35 of the cradle. The spindle 27 is adapted to be continuously rotated to effect continuous rotation of the tool 25 by the train of gearing shown, which includes a shaft 36, having fixed thereon a pulley 37, which may be rotated from any suitable source of power. The shaft 36 is provided at its inner end with a pinion 38 (Fig. 3) adapted to engage the double pinion 39 mounted on a transverse shaft 40. The pinion 39 drives the shaft 41 (Fig. 2) through the medium of a gear 42 fixed to the lower end of said shaft. This shaft 41 is slidably mounted at its opposite end in a suitable bearing on the machine and carries a pinion 43 (Fig. 4) adapted to engage a pinion 44 on a shaft 45 which is provided at its inner end (Fig. 2) with a pinion 46 which meshes with the gear 47 from which the tool may be driven by any suitable gearing arrangement.

The blank is rotated about its own axis, while in engagement with the tool, in timed relation with the cradle roll to secure the required generating motion. The blank is indexed during the period it is out of engagement with the tool and this indexing movement is preferably accomplished by speeding up or retarding the rate of rotation of the blank during the interval between its engagement with successive blades of the tool.

Figure 8:
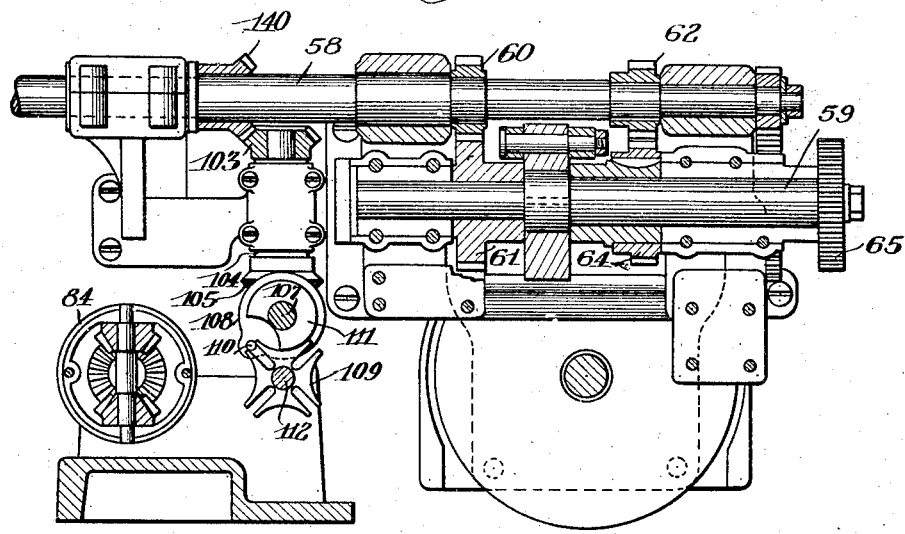
Fig. 8 is a sectional view on the line 8—8 of Fig. 7, parts being shown in elevation.
Figure 7:
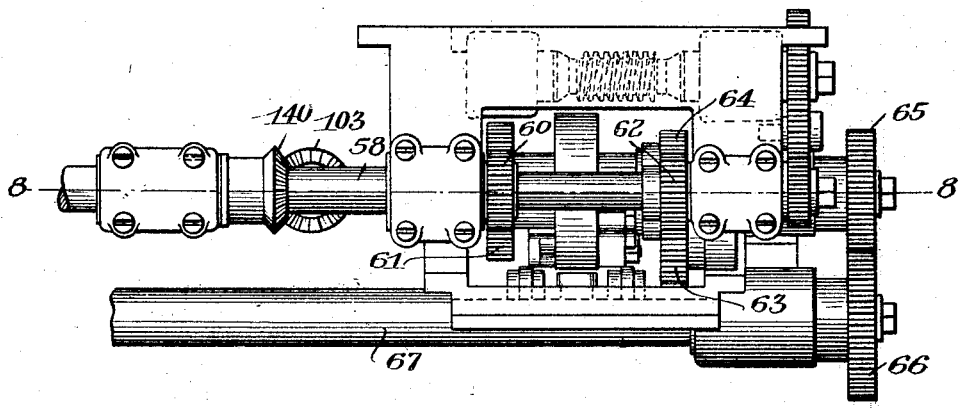
Fig. 7 is a detail view showing a portion of the reversing mechanism of the machine and details of the connections between shafts.

The means for imparting to the blank its rotary motion during cutting will now be described. Mounted on the shaft 36 (Fig. 2) is a bevel gear 48 which engages a similar gear 49 mounted on a shaft 50 which carries a gear 51 which meshes with a gear 52 mounted on a shaft 53 (Fig. 1) which is provided at its inner end with an arm 54 (Fig. 11) carrying a gear 55 which through the idler 56 drives the gear 57 and the shaft 58 to which the gear 57 is secured. Mounted on the shaft 58 intermediate its ends is a bevel gear 140 (Figs. 1 and 8) which serves to actuate the indexing mechanism, as will presently be described. Mounted adjacent the shaft 58 is a reversible shaft 59 (Fig. 8), adapted to be driven in opposite directions from the shaft 58 by a suitable reversing mechanism. This reversing mechanism may be of any desired type. The embodiment illustrated is that shown and described in the patent to James E. Gleason and Arthur L. Stewart, reissued as No. 15,759, February 12, 1924, and reference may be had to that patent for a detailed description of such mechanism. It is sufficient to say here that the shaft 59 may be driven from the shaft 58 either through the pinion 60 and gear 61 or through the pinion 62, idler 63 and gear 64 (Figs. 7 and 8). This reversing mechanism is employed in order that the parts of the machine may be restored rapidly to the position at the beginning of the generating roll.

The shaft 59 is provided with a gear 65 which engages the gear 66 (Fig. 7) secured to the shaft 67 which is provided at its inner end with a gear 68 (Fig. 1) which serves to actuate the mechanism for oscillating the cradle and this shaft 67 is also provided with a gear 69 (Fig. 10) from which the blank rotation is derived.

Figure 6:
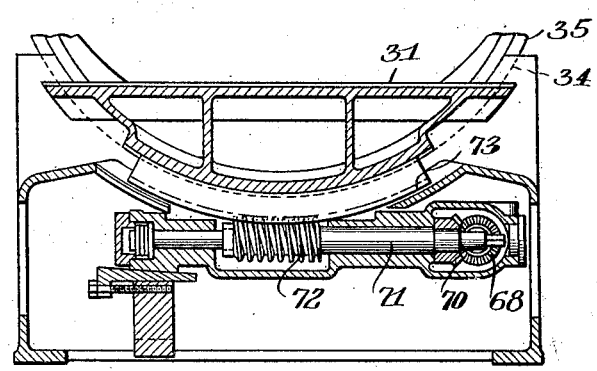
Fig. 6 is a vertical sectional view on the line 6—6 of Fig. 1.

The gear 68, as above stated, actuates the mechanism for moving the cradle, that is, for imparting the generating roll. The gear 68 meshes with a gear 70 (Figs. 1 and 6) mounted on the worm shaft 71 carrying the worm 72 which engages and drives the segment 73 which is secured to the cradle 31.

Figure 9:
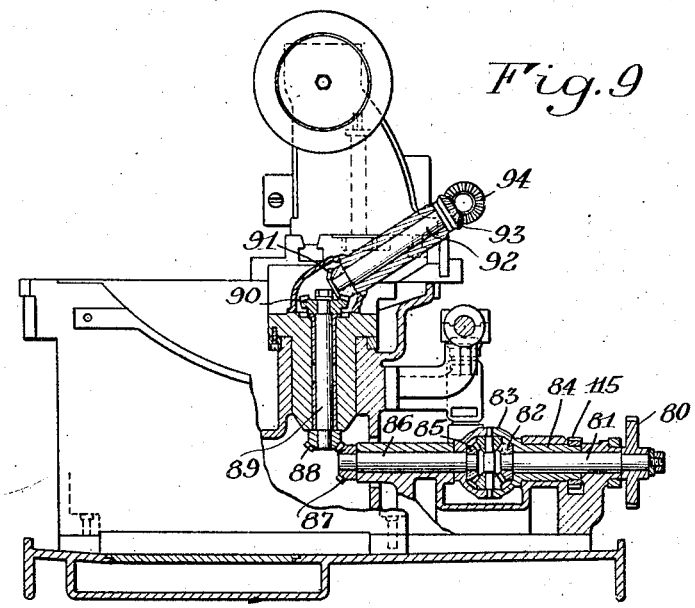
Fig. 9 is a vertical sectional view on the line 9—9 of Fig. 1, parts being shown in elevation.

The bevel gear 69 (Fig. 10) meshes with a similar gear 74 keyed to the stub shaft 75 to which is secured the gear 76 which meshes with the gear 77 on the stub shaft 78, which carries a second gear 79 which meshes with the gear 80 secured to the shaft 81 (Fig. 9). The shaft 81 has secured to it a gear 82 which through the pinions 83 secured to the differential housing 84 drives the gear 85 which is secured to one end of a shaft 86 upon the other end of which is mounted a miter gear 87 engaging the miter 88 mounted upon the shaft 89 which carries the gear 90 which meshes with and drives the pinion 91 secured to the shaft 92 upon the other end of which is mounted the pinion 93 engaging the gear 94 (Figs. 9 and 1) which is secured to the shaft 95 upon the opposite end of which is keyed the miter gear 96 which meshes with the miter 97 which is secured to the worm shaft 98 (Fig. 5). This shaft 98 carries the worm 99 which meshes with the worm wheel 100 (Figs. 1 and 5) fastened to the blank spindle 101. The blank 102 which is secured to the spindle 101 is rotated in proper ratio to the cradle movement by the means just described.

Figure 10:
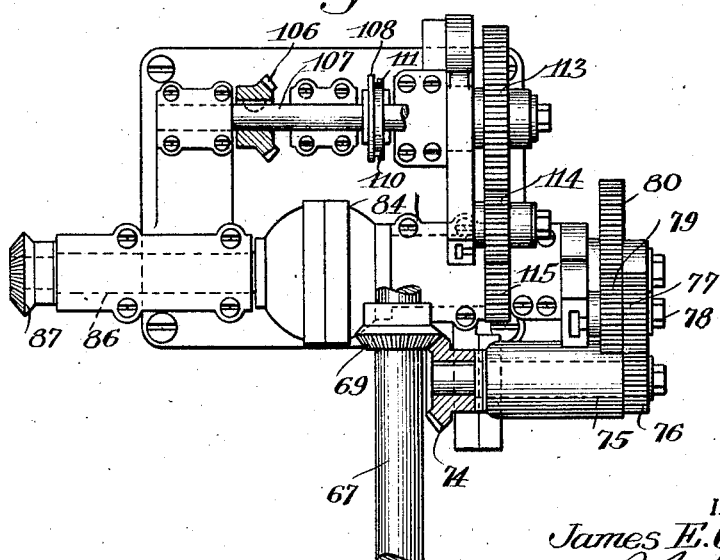
Fig. 10 is a detail plan view of a portion of the gearing which controls the motion from the blank carrier.

As previously stated, the blades 26 of the tool are preferably so spaced apart as to permit indexing of the blank between engagement therewith of successive blades or successive groups of blades. The indexing mechanism will next be be described. Mounted on the shaft 58, as already mentioned, is a bevel gear 140 (Figs. 1 and 8). This bevel gear 140 is adapted to mesh with a bevel gear 103 on shaft 104 which carries bevel gear 105 which meshes with the bevel gear 106 secured to the shaft 107 (Fig. 10). This shaft 107 carries one element of an intermittent mechanism, comprising the disc 108 and the Geneva wheel 109. The disc 108 is provided with a pin 110 adapted to rotate the Geneva wheel periodically and with the locking portion 111 which serves to retain the Geneva wheel against rotation save when actuated by the pin 110. The Geneva wheel 109 is mounted on a shaft 112 to which is secured the gear 113 (Fig. 10) which meshes with the gear 114 which engages the gear 115 which is secured to the hub of the differential housing 84 (Fig. 9).

The Geneva motion is so arranged that the differential housing will be periodically rotated. This rotation takes place in the interval in which the blank is out of engagement with the tool and its effect is to speed up or retard the blank rotation, depending upon the speed of the blank during the cut, so as to index the blank and present a different tooth space to the tool to be operated upon when the tool and blank next come into engagement.

The blank is adjustably mounted on the table 116 so as to be moved about its apex into proper cutting position. The mechanism for adjusting the blank may be of any type commonly employed in this class of machinery or of any other suitable form. Due to the method which forms the basis of this invention, the blank can be adjusted into position at the beginning of the cut and maintained in position until completely generated. It is not necessary to withdraw the tool and blank relatively to each other for indexing.

The machine of this invention may be used for either finishing blanks previously roughed out or for completely generating gears from the solid. If it is desired to completely generate the gears, any suitable type of feeding mechanism may be employed, such as that illustrated in the Patent No. 1,203,608, issued November 7, 1916.

The faces of the teeth of the blank may be cut one side at a time, or two adjacent tooth faces may be cut simultaneously. The latter method of cutting is illustrated diagrammatically in Fig. 12, where the cutting blades are shown arranged in groups 120 comprising a pair of blades one of which is adapted to cut each side of a tooth space. One group of blades 120 is shown operating upon the groove 121 of the blank. After this group has passed out of engagement with the blank, the blank will be indexed and the next group will enter the next groove 122 of the blank.

While I have described the blades as arranged in groups or spaced apart for engagement with successive grooves on the blank, it will be understood, that any other suitable arrangement of blades is contemplated within the scope of this invention as defined in the claims. The cutting edges of these blades may be straight, spherical or of any suitable curvature.

While I have described my invention in connection with the production of bevel gears and in connection with a machine for the production of such gears, it will be understood that with suitable modifications it is applicable to the production of other types of gears also, generated as well as non-generated.

In the embodiment of the invention described the axis of the spindle is shown parallel to the axis of the cradle and the relative motion between tool and blank will be as of a gear rolling on a crown gear of which the tool represents a tooth. It is to be understood, however, that when the invention is practiced in connection with the generation of gears, it is not limited to use in a generating process where the tool represents a tooth of a crown gear, but may be applied also to other generating processes as where the tool represents a tooth of a mate gear to the gear being cut, etc. Where gears are to be generated, moreover, it is to be understood, that the generating roll may be applied to either tool or blank or both.

In general, it may be said that while I have described a particular embodiment of my invention, it is to be understood that the invention is capable of various further modifications without departing from its intent, and that this application is intended to cover any adaptations or embodiments, following in general, the principles of the invention and including such departures from the present disclosure as come within known or customary practise in the gear art and as may be applied to the essential features hereinbefore set forth and as fall within the scope of the appended claims.

Having thus described my invention, what I claim is:

1. The method of producing gears which consists in adjusting a tool, provided with a plurality of equi-distantly spaced cutting blades, and a gear blank into cutting position, rotating the tool in engagement with the blank to produce teeth on the blank and indexing the blank periodically and in the interval between the engagement therewith of successive blades of the tool and while in said cutting position.

2. The method of producing gears which consists in adjusting a tool, provided with a plurality of equi-distantly spaced cutting blades projecting from a plane face, and a gear blank into cutting position, rotating the tool about its axis continuously in one direction, and indexing the blank periodically, while maintained in cutting position and in the interval between the engagement therewith of successive blades of the tool.

3. The method of producing gears which consists in adjusting a tool, provided with a plurality of equi-distantly spaced cutting blades, and a gear blank into cutting position, rotating the tool continuously in one direction and periodically varying the relative speed of tool and blank to index the blank while in cutting position.

4. The method of producing gears which consists in adjusting a tool, having an effective cutting portion projecting from a plane face and occupying a part of its periphery only, and a gear blank into cutting position, rotating the tool continuously in one direction and varying the relative speed of tool and blank while in cutting position and during the interval the effective cutting portion of the tool is out of engagement with the blank to index the blank.

5. In a machine of the class described, a tool support, a tool provided with a plurality of equidistantly spaced blades mounted on said support, means for rotating the tool continuously in one direction, a blank support, and means for indexing the blank periodically in the interval between the engagement therewith of successive blades of the tool.

6. In a machine for producing gears, a tool support, a rotary tool mounted thereon, having an effective operative portion projecting from a plane face and occupying a part of its periphery only, a blank support, means for rotating the tool on its axis continuously in one direction, and means for periodically varying the relative speed of tool and blank, while in cutting position and during the interval the effective cutting portion of the tool is out of engagement with the blank, to index the blank.

7. In a machine for producing gears, a tool support, a rotary tool having a plurality of cutting blades projecting from a plane face, mounted on said tool support, a blank support, means for adjusting the tool and blank supports relatively to each other to bring the tool and blank into cutting position, means for rotating the tool about its axis continuously in one direction and means for periodically indexing the blank and in the interval between the engagement therewith of successive blades of the tool.

8. The method of producing gears which consists in adjusting a tool and blank into cutting position, rotating the tool and blank about their respective axes continuously in one direction, while imparting an additional relative movement between the tool and blank, continuously in one direction, and periodically varying the relative speed of tool and blank to index the blank periodically during said generating movement.

9. The method of producing gears which consists in adjusting a tool and a gear blank into cutting position, rotating the tool in a curved path continuously in one direction, while rotating the blank continuously on its own axis, imparting an additional relative movement between the tool and blank, continuously in one direction and periodically varying the relative speed of tool and blank to index the blank.

10. The method of producing bevel gears which consists in adjusting a tool and blank into cutting position, rotating the tool and blank about their respective axes, continuously in one direction while imparting an additional relative movement between the tool and blank about the apex of the blank, continuously in one direction and imparting a periodic indexing movement to the blank during said last named movement.

11. The method of producing bevel gears which consists in adjusting a tool and a gear blank into cutting position, moving the tool continuously in one direction and in a curved path while rotating the blank about its own axis and while imparting an additional relative movement between the tool and blank about the apex of the blank, continuously in one direction, and periodically imparting an indexing movement to the blank during said last named movement and while in cutting position.

12. The method of producing gears which consists in adjusting a tool having a plurality of equi-distantly spaced cutting portions, and a gear blank into cutting position, rotating the tool and blank about their respective axes continuously while imparting an additional relative movement between the tool and blank continuously in one direction and varying the relative speed of tool and blank rotation periodically in the interval between engagement therewith of successive blades of the tool to index the blank.

13. The method of producing gears which consists in adjusting a tool, provided with a plurality of equi-distantly spaced cutting portions projecting from a plane face, and a gear blank into cutting position, in rotating the tool and blank about their respective axes continuously while imparting an additional relative movement between the tool and blank continuously in one direction and varying the relative speed of tool and blank rotation periodically in the interval between engagement therewith of successive blades of the tool, to index the blank.

14. The method of producing gears which consists in adjusting a tool, provided with a plurality of equi-distantly spaced cutting blades, and a gear blank into cutting position, in rotating the tool and blank about their respective axes continuously while imparting an additional relative movement between tool and blank, about the apex of the blank, continuously in one direction and varying the speed of rotation of the blank periodically and in the interval between engagement therewith of successive blades of the tool, to index the blank.

15. The method of producing gears which consists in adjusting a tool, provided with a plurality of equi-distantly spaced cutting portions projecting from a plane face, and a gear blank into cutting position, rotating the tool and blank about their respective axes continuously while imparting an additional relative movement between tool and blank, about the apex of the blank, continuously in one direction and varying the speed of rotation of the blank periodically and in the interval between engagement therewith of successive blades of the tool, to index the blank.

16. In a machine for producing gears, a tool support, a blank support, means for adjusting the tool and blank supports to bring the tool and blank into cutting position, means for rotating the tool and blank supports about their respective axes, means for imparting an additional relative movement between the tool and blank supports continuously in one direction and means for indexing the blank periodically during said last named movement.

17. In a machine for producing bevel gears, a tool support, a blank support, means for adjusting the tool and blank supports to bring the tool and blank into cutting position, means for rotating the tool and blank supports about their respective axes, means for imparting a relative generating movement between the tool and blank supports, about the apex of the blank, continuously in one direction and means for indexing the blank periodically during said last named movement.

18. In a machine for producing gears, a tool support, a tool provided with a plurality of cutting blades equi-distantly spaced from each other, mounted on said tool support, a blank support, means for adjusting the tool and blank supports relatively to each other to bring the tool and blank into cutting position, means for rotating the tool and blank supports about their respective axes, means for imparting an additional relative movement between the tool and blank supports continuously in one direction, and means for periodically indexing the blank and in the interval between engagement therewith of successive blades of the tool.

19. In a machine for producing gears, a tool support, a tool provided with a plurality of equi-distantly spaced cutting portions, mounted on said tool support, a blank support, means for adjusting the tool and blank supports relatively to each other to move the tool and blank into cutting position, means for rotating the tool and blank about their respective axes continuously, means for imparting an additional relative movement between the tool and blank, about the apex of the blank, continuously in one direction, and means for varying the speed of rotation of tool and blank relatively to each other, periodically and in the interval between engagement with the blank of successive blades of the tool to index the blank.

20. In a machine for producing gears, a tool support, a tool provided with a plurality of equi-distantly spaced cutting portions projecting from a plane face, mounted on said tool support, a blank support, means for adjusting the tool and blank supports relatively to each other to move the tool and blank into cutting position, means for rotating the tool and blank supports about their respective axes continuously, means for imparting an additional relative movement between the tool and blank, about the apex of the blank, continuously in one direction, and means for varying the speed of rotation of the tool and blank relatively to each other, periodically and in the interval between engagement with the blank of successive blades of the tool to index the blank.

21. In a machine for producing bevel gears, a tool support, a blank support, means for adjusting the tool and blank supports relatively to each other to move the tool and blank into cutting position, means for rotating the blank support about its axis means for simultaneously moving the tool continuously in one direction and in a curved path, means for imparting an additional relative movement between tool and blank about the apex of the blank and means for indexing the blank periodically while in cutting position.

22. In a machine for producing gears, a blank support, a tool, means for adjusting the tool and blank support into cutting position, means for rotating the tool and blank support about their respective axes continuously, means for imparting an additional relative movement between tool and blank support continuously in one direction, said last named movement being in timed relation with the rotation of the blank support during cutting, and means for periodically varying the speed of rotation of the blank support relative to said generating movement, while the tool and blank are out of engagement, to index the blank.

23. In a machine for producing bevel gears, a tool support, a tool provided with a plurality of equi-distantly spaced cutting blades projecting from a plane face, mounted on said support, a blank support, means for adjusting the tool and blank supports into cutting position, means for rotating the tool and blank supports about their respective axes continuously, means for imparting an additional relative movement between the tool and blank supports continuously in one direction, said last named movement being in timed relation with the blank support rotation during cutting, and means for periodically varying the speed of rotation of the blank support relative to the last named movement, to index the blank.

24. In a machine for producing gears, a tool support, a tool provided with a plurality of equi-distantly spaced cutting portions, mounted on said tool support, a blank support, means for adjusting the tool and blank supports to move the tool and blank into cutting position, means for rotating the tool and blank about their respective axes, continuously, means for imparting an additional relative movement between tool and blank continuously in one direction and means for varying the relative speed of rotation of tool and blank relatively to each other periodically and in the interval between engagement with the blank of successive blades of the tool.

25. In a machine for producing gears, a tool support, a tool, provided with a plurality of equi-distantly spaced cutting portions projecting from a plane face, mounted on said tool support, a blank support, means for adjusting the tool and blank supports to move the tool and blank into cutting position, means for rotating the tool and blank about their respective axes, continuously, means for imparting an additional relative movement between tool and blank continuously in one direction and means for varying the relative speed of rotation of tool and blank periodically and in the interval between engagement with the blank of successive blades to the tool, to index the blank.

26. In a machine for producing gears, a tool support, a blank support, a tool provided with a plurality of equi-distantly spaced cutting blades projecting from a plane face, mounted on said tool support, means for adjusting the tool and blank into cutting position, means for rotating the tool and blank supports about their respective axes, means for imparting an additional movement between the tool and blank supports continuously in one direction, and means for indexing the blank in the interval between engagement therewith of successive blades of the tool.

27. In a machine for producing bevel gears, a tool support, a tool, provided with a plurality of equi-distantly spaced cutting blades projecting from a plane face, mounted on said tool support, a blank support, means for adjusting the tool and blank supports relatively to each other to bring the tool and blank into cutting position, means for rotating the tool and blank supports about their respective axes, means for imparting an additional relative movement between the tool and blank supports, about the apex of the blank, continuously in one direction and means for indexing the blank periodically and in the interval between engagement therewith of successive blades of the tool.

JAMES E. GLEASON.